Patented Dec. 7, 1937

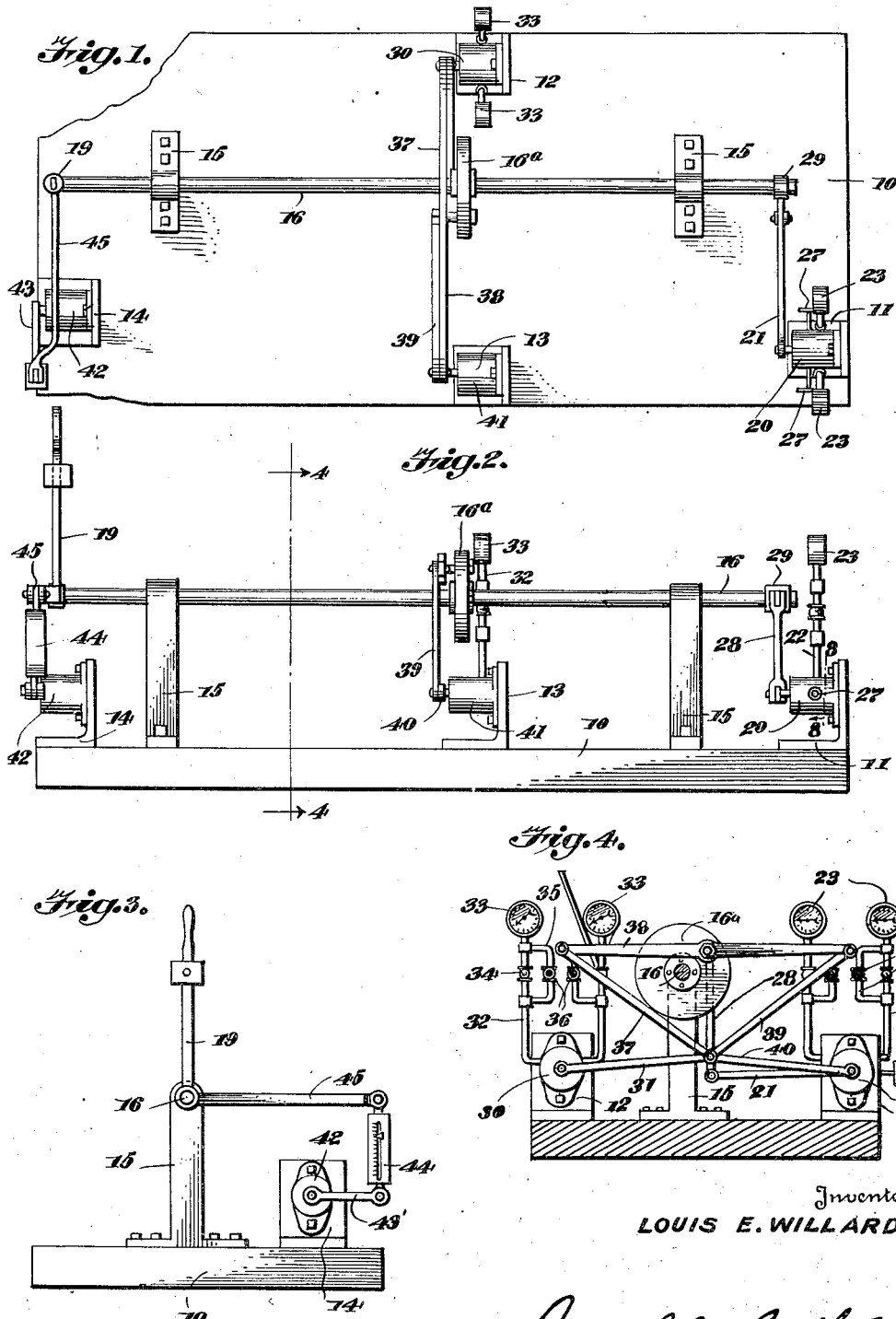

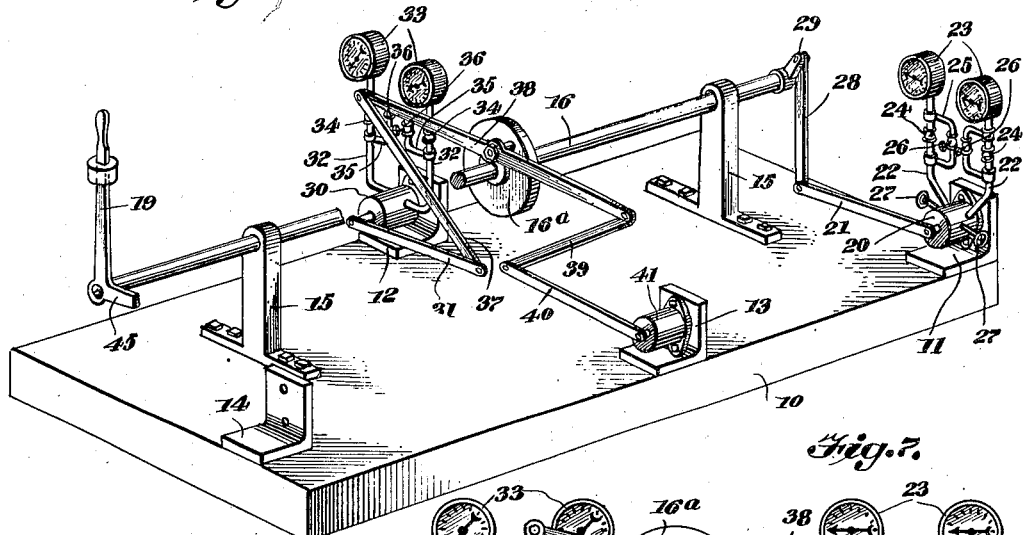

2,101,228

UNITED STATES PATENT OFFICE 2,101,228

TESTING MACHINE FOR SHOCK ABSORBERS AND THE LIKE

Louis E. Willard, Dallas, Tex., assignor of fifty-one percent to John M. Hanford, Dallas, Tex.

Application May 8, 1936, Serial No. 78,695

6 Claims. (Cl. 73—51)

This invention relates to a testing mechanism for hydraulic shock absorbers, pumps, brakes and the like, and has for one of its objects the production of a simple and efficient means for weighing or testing the efficiency of shock absorbers and similar devices.

A further object of this invention is the production of a simple and efficient testing machine or mechanism for testing the resistance set up by the device being tested according to the rapidity of the compression within the device which is being tested.

Other objects and advantages of the present invention will appear throughout the following specification and claims.

In the drawings:—

Figure 1 is a top plan view of the testing machine;

Figure 2 is a side elevation thereof;

Figure 3 is an end elevation of the hand operating lever and spring scale for testing the resistance of a shock absorber, certain other parts of the mechanism being eliminated;

Figure 4 is a section taken on line 4—4 of Figure 2;

Figure 5 is a perspective view of the testing machine, the operating shaft being broken away and partly shown in section;

Figure 6 is an end elevation of the operating elements of the machine, the base and operating shaft being shown in section; and the links being connected in a manner for checking the accuracy of the machine preparatory to weighing the actual resistance of the device to be tested;

Figure 7 is a similar view to Figure 6, the links being connected in a position for weighing and testing the actual resistance of the device to be tested; and Figure 8 is a transverse section taken on line 8—8 of Figure 2, looking in the direction of the arrow.

By referring to the drawings, it will be seen that 10 designates the base or platform upon which is mounted at one end and near one corner, a shock absorber supporting block 11. Intermediate the ends of the base 10 and upon opposite sides of the longitudinal center are located the supporting blocks 12 and 13. A fourth supporting block 14 is also carried by the base 10 at the end opposite the block 11.

The base or platform 10 supports a pair of spaced upwardly extending journals 15 upon which journals 15 is mounted an operating shaft 16 extending longitudinally of the base or platform 10. A weighted lever 19 is provided at one end of the shaft whereby the shaft may have a partial rotation or oscillating movement imparted to it. Other suitable means may be employed for actuating the shaft in place of the lever if so desired.

A testing cylinder 20 which may be of a type similar to that of a hydraulic shock absorber is secured to the block 11, and this cylinder supports a crank arm 21 similar to the crank arm of a shock absorber. The cylinder 20 is preferably of a double action shock absorber type having a pair of upwardly extending pipes 22 communicating with the testing cylinder 20, each pipe 22 supporting a meter 23 at its upper end. Each pipe 22 carries a check valve 24 and a by-pass 25 spanning the check valve 24, each by-pass 25 being provided with a manually operated valve 26 whereby the by-pass 25 may be opened and closed at the will of the operator. The testing cylinder 20 is also provided with a pair of manually controlled or operated valve members 27 whereby the pressure within the testing cylinder 20 may be regulated for the purpose hereinafter described.

The crank arm 21 of the testing cylinder 20 is connected at its outer end to a link 28 which in turn is connected to a crank arm 29 carried by the shaft 16 at its end opposite the lever 19.

The block 12 supports a testing cylinder 30 similar to the cylinder 20, which testing cylinder 30 carries an inwardly extending arm 31 similar to the arm 21. This cylinder 30 supports a pair of upwardly extending pipes 32 which carry gages 33 at their upper ends. Each pipe 32 is also provided with a check valve 34 to prevent the downward flow of pressure and a by-pass 35 to relieve the pressure, each by-pass carrying a manually operated valve 36 whereby the operator may relieve the pressure from the gages when desired. The valves 26 and 36 are used to release the pressure back into the cylinders past the gauge check valves when the test is finished. It should be understood that paired mechanism is employed to provide double functions, that is to say, one for high pressure and one for low pressure.

The arm 31 is connected to a link 37, which in turn is pivotally connected to a beam arm 38 carried by the shaft 16. The opposite end of the beam arm 38 is connected to a link 39, which link 39 is adapted to be connected to the arm 40 of the shock absorber 41, which is adapted to be tested and which is for this purpose attached to the supporting block 13. The balanced beam or beam arm 38 is eccentrically connected to the disc 16ª carried by the shaft 16 and when the arm engages the shaft 16 as shown in Figure 7 further rotation of the shaft towards the right in this figure will tilt the beam 38 about its pivot and the link 39 and the shock absorber arm 40 will move downwardly for a full downward movement of the shock absorber arm.

For the purpose of illustration and demonstration, a shock absorber 42 may be secured to the supporting block 14 and the crank arm 43 of the shock absorber 42 may be connected to one end of a spring scale 44, the opposite end of the spring scale 44 being connected to the angularly extending arm 45 of the lever 19. The resistance of the shock absorber lever or arm 43' would register on the scale 44 when the lever 19 is moved, this only giving the resistance of the shock absorber. It is necessary, however, for actual and practical purposes to not only measure the shock or resistance, but also the timed movement in terms of rapidity or in other words, the rapidity with which the shock is absorbed.

When it is desired to actually and practically test the shock absorber, such for instance as the shock absorber 41, this shock absorber 41 is attached to the supporting block 13, in order to weigh its resistance by a working balance. As previously described, there is illustrated a double acting shock absorber, but it should be understood that the principle is the same for a single acting absorber. Hence, it is pointed out that a single acting shock absorber may be substituted and only one gage used as will be obvious.

In making a test, the shock absorber 30 is of a known resistance, having been previously tested, and the link 39 is disconnected from the lever 40 and is connected to the arm 31 and the lower end of the link 37, as at 46, in the position shown in Figure 6. In this position a crank movement for the arm 31 is similar to the crank movement for the arm 21 carried by the cylinder 20. The shaft 16 may be then moved, such for instance as by oscillation by any power source, that is by the lever 19 or through the pulley 17 and belt 18. As this movement takes place, pressure is built up in the meters 23 and 33, the shock absorbers 20 and 30 becoming pumps or acting as pumps actuated through the operation of the crank motion of the arms 21 and 31 respectively. Regardless of the rapidity of this action, the gages will hold the same relation to each other provided the manually operated valves 27 are adjusted to cause the gages to properly balance under this action, the gages all registering the same as shown in Figure 6. In other words, all of the gages will read together regardless of their speed or motion and in this manner the operator may be able to check the accuracy of the machine before making the test on the shock absorber or other device which is to be tested when placed upon the block 13. A typical type of valve 27 is shown in Figure 8, but any known structure for this purpose may be used.

The balanced beam 38 is mounted eccentrically upon the shaft 16 through the disc 16ᵃ in the same relative position with respect to the connection of the link 28 with the crank 29.

Now, when it is desired to test the shock absorber 41, for instance, this shock absorber 41 or other device to be tested, will be placed upon the block 13 and the link 39 will be connected to the arm 40. When the shaft 16 is partially rotated or oscillated, the resistance of the shock absorber 41 will be indicated upon the meters 33 through the balanced arm or beam arm 38, the meters 33 indicating the resistance by noting the difference in the readings of the meters 23 and the meters 33. It should be understood that the test is secured by a running balance in comparison of the meters 33 with the meters 23 or the comparison of the new reading of the meters 33 with that of the old meters 23. The action of the tested shock absorber 41 will disturb the reading of the meters 33 and in this way allow the proper test to be made.

It should be understood that as stated above, any suitable or desired means may be employed for operating the shaft 16, and it is not desired to limit the particular type of device to be tested to that of a shock absorber since the testing machine may be employed for testing pumps, brakes, and other similar devices, without departing from the spirit of the invention, and only one gage may be used upon a single shock absorber in place of the two gages now shown for testing a double shock absorber.

Certain detail changes in the mechanical construction, combination and arrangement of parts may be employed without departing from the spirit of the invention so long as such changes fall within the scope of the appended claims.

Having described the invention, what is claimed as new is:

1. A testing device of the class described comprising a base, an operating shaft, a plurality of testing cylinders arranged upon opposite sides of the shaft, crank means connected to the testing cylinders for building up pressure within the cylinders as said shaft is actuated, gage means carried by each cylinder for indicating the pressure built up in the cylinders, means for regulating the pressure within one cylinder whereby the pressure built up in both cylinders may be indicated as being uniform upon the gages, and means for forming a detachable connection between a device to be tested and said operating shaft for causing the resistance in the device being tested relative to one of the first mentioned cylinders to be registered upon the gages associated with the last mentioned cylinder.

2. A testing device of the class described comprising a base, an operating shaft carried thereby, a plurality of testing cylinders carried by the base, gage means for indicating the pressure within each cylinder, lever means connecting said operating shaft with the respective cylinders, whereby pressure may be built up within the cylinders as said shaft is operated, means for regulating the pressure within one cylinder whereby the pressure within both cylinders may be recorded as being balanced upon the gages carried thereby, a hydraulic shock absorber to be tested supported upon said base, and link means connecting said shock absorber with said operating shaft whereby the resistance of the shock absorber to be tested will cause the gages of one of said cylinders to be unbalanced in proportion to the amount of difference between the pressure in the balancing cylinder and the shock absorber being tested thereby permitting the operator to determine the necessary adjustment to be made on the shock absorber tested by subtracting the difference as noted by the gages upon the two cylinders.

3. A testing device of the class described comprising a base, an operating shaft carried thereby, a plurality of testing cylinders carried by the base, gage means for indicating the pressure within each cylinder, lever means connecting said operating shaft with the respective cylinders, whereby pressure may be built up within the cylinders as said shaft is operated, means for regulating the pressure within one cylinder whereby the pressure within both cylinders may be recorded as being balanced upon the gages carried thereby, a hydraulic shock absorber to be tested supported upon said base, and link means connecting said shock absorber with said operating shaft whereby the resistance of the shock absorber to be tested will cause the gages of one of said cylinders to be unbalanced in proportion to the amount of difference between the pressure in the balancing cylinder and the shock absorber being tested thereby permitting the operator to determine the necessary adjustment to be made on the shock absorber tested by subtracting the difference as noted by the gages upon the two cylinders.

4. A device of the class described comprising a base, a plurality of pressure cylinders supported in different positions upon said base, an operating shaft carried by said base and extending longitudinally between said pressure cylinders, operating arms for said pressure cylinders for building up a pressure within the cylinders as said arms are swung, lever means for connecting said shaft to said arms whereby pressure may be built up in both cylinders simultaneously, gages for said cylinders, pipes supporting said gages and operatively connecting them with the cylinders, each pipe having a check valve for preventing return flow of pressure from the gage to the cylinder, each pipe having a manually controlled by-pass for permitting the pressure to be returned to the cylinder, and means for connecting a shock absorber being tested with the lever means associated with one cylinder.

5. A device of the class described comprising a base, a plurality of pressure cylinders supported in different positions upon said base, an operating shaft carried by said base and extending longitudinally between said pressure cylinders, operating arms for said pressure cylinders for building up a pressure within the cylinders as said arms are swung, levers extending laterally from said shaft, links for connecting said levers to said arms whereby pressure may be built up in both cylinders simultaneously, gages for said cylinders, pipes supporting said gages and providing means connecting them with the cylinders, each pipe having a check valve for preventing return flow of pressure from the gage to the cylinder, each pipe having a manually controlled by-pass for permitting the pressure to be returned to the cylinder, one of said cylinders having valve means for regulating the pressure therein whereby the pressure of the two cylinders may be adjusted uniformly and a link carried by one lever for connecting the said lever with a shock absorber being tested.

6. A device of the class described comprising a base, an operating shaft, a beam arm eccentrically carried by the shaft, means for actuating the shaft, a pressure cylinder carried by said base and having an actuating arm adapted to build up pressure within the cylinder as the arm is actuated, a crank connected with said shaft, a link connecting said crank to said arm, a second pressure cylinder also having an actuating arm, said last mentioned actuating arm being connected to one end of said beam arm, said beam arm extending upon opposite sides of said shaft and having a link connection at its outer end with a pressure device to be tested in and for the purpose specified, the beam arm being eccentrically mounted with respect to said shaft to align with the connection of said crank means with said link.

LOUIS E. WILLARD.